United States Patent [19]

Violland et al.

[11] 4,201,824

[45] May 6, 1980

[54] HYDROPHILIC POLYURETHANES AND THEIR APPLICATION AS SOIL-RELEASE, ANTI-SOIL REDEPOSITION, AND ANTI-STATIC AGENTS FOR TEXTILE SUBSTRATES

[75] Inventors: Robert Violland, Lyons; Alain Lagasse, Villeurbanne, both of France

[73] Assignee: Rhone-Poulenc Industries, Paris, France

[21] Appl. No.: 804,391

[22] Filed: Jun. 7, 1977

Related U.S. Application Data

[63] Continuation-in-part of Ser. No. 748,296, Dec. 7, 1976, abandoned.

[51] Int. Cl.$^2$ .................. B32B 27/04; C08G 18/42; D06M 15/12; C08L 75/06
[52] U.S. Cl. .................. 428/262; 8/115.6; 260/37 N; 260/29.2 TN; 252/99; 252/109; 252/DIG. 2; 252/DIG. 15; 428/264; 428/265; 428/267; 528/66; 528/904; 252/135; 252/50; 252/553; 252/174.23; 260/DIG. 17
[58] Field of Search .......... 260/75 NP, 75 NK, 37 N, 260/29.2 TN; 428/96, 262, 395, 425; 252/DIG. 15, 97, 99, 89 R, 102, 109, 110, 525, 544, 550, 553, DIG. 2; 8/115.6 A; 528/66

[56] References Cited

U.S. PATENT DOCUMENTS

| | | | |
|---|---|---|---|
| 2,948,691 | 8/1960 | Windemuth et al. | 260/29.2 TN |
| 2,998,403 | 8/1961 | Mueller et al. | 260/75 NP |
| 3,598,633 | 8/1971 | Rudman | 428/425 |
| 3,617,352 | 11/1971 | Shima et al. | 260/29.2 TN |
| 3,639,309 | 2/1972 | Starkman et al. | 8/115.6 A |
| 3,655,437 | 4/1972 | Becker et al. | 260/29.2 TN |
| 3,658,940 | 4/1972 | Galin | 260/29.2 TN |
| 3,695,924 | 10/1972 | Wagner | 260/29.2 TN |
| 3,896,035 | 7/1975 | Schultz | 260/29.2 TN |
| 3,985,923 | 10/1976 | Basadur | 8/115.6 A |
| 4,020,015 | 4/1977 | Bevan | 252/DIG. 15 |
| 4,028,313 | 6/1977 | Mueller et al. | 260/29.2 TN |
| 4,061,618 | 12/1977 | Stanley et al. | 260/29.2 TN |
| 4,068,035 | 1/1978 | Violland et al. | 260/29.2 TN |

*Primary Examiner*—H. S. Cockeram
*Attorney, Agent, or Firm*—Burns, Doane, Swecker & Mathis

[57] ABSTRACT

Novel linear hydrophilic polyurethane polymers are presented. The polymers provide outstanding soil-release, anti-soil redeposition and anti-static properties when applied to natural and synthetic textile substrates, especially textile substrates containing polyester fibers. These polyurethanes are particularly useful in detergent compositions.

90 Claims, No Drawings

HYDROPHILIC POLYURETHANES AND THEIR APPLICATION AS SOIL-RELEASE, ANTI-SOIL REDEPOSITION, AND ANTI-STATIC AGENTS FOR TEXTILE SUBSTRATES

CROSS-REFERENCE TO RELATED APPLICATION

This is a continuation-in-part application of Ser. No. 748,296, filed Dec. 7, 1976, now abandoned.

BACKGROUND OF THE INVENTION

1. Field of the Invention

This invention relates to new polyurethane polymers. More particularly, this invention relates to new hydrophilic polyurethane polymers and their application to textile substrates as soil-release, anti-soil redeposition and anti-static agents, and especially to textile substrates containing polyester fibers.

2. Description of the Prior Art

Much research has been directed to the attainment of textile materials having improved soil-release properties. Many of the synthetically produced commercial fibers that are used alone or in blends with each other or incorporated in blends with naturally occurring fibers have a propensity to accept and retain oily grime and dirt. Once the textile material becomes soiled, it is then subjected to a cleaning process for removal of the dirt and/or oily deposits, and only a dry cleaning process will successfully clean the textile material.

The cleaning process normally employed, however, is washing in a conventional home washing machine. In such washing procedures it is virtually impossible to remove the soil and/or oily stains from the textile material, and assuming that the undesirable materials are removed from the textile and/or a fairly clean textile material is being washed, soil remaining in the wash water is redeposited onto the textile material prior to the end of the wash cycle. Hence, when the textile material is removed from the washing machine and subsequently dried, it has not been properly cleaned. Such a condition, heretofore unavoidable, does not satisfy modern requirements in that the textile material after use never again assumes a truly clean appearance, but instead tends to gray and/or yellow due to the soil and/or oily materials deposited and remaining thereon.

The problem heretofore associated with fabrics having synthetic fibers incorporated therein or made entirely of synthetic fibers, has been that the synthetic fibers, as well as being hydrophobic, are oleophilic. Therefore, while the oleophilic characteristics of the fiber permit oil and grime to be readily embedded therein, the hydrophobic properties of the fiber prevent water from entering the fiber to remove contaminants therefrom.

One remedy to the soil removal and soil redeposition phenomenon is to deposit a finish onto the fiber to impart a hydrophilic character to the fiber. Attempts have been made to reduce the oleophilic characteristics of these synthetic fibers by coating the fibers with a coating that is oleophobic, i.e., will hinder the attachment of soil and oily materials to the fibers. Many polymer systems have been proposed which are capable of forming a film around the fibers that constitute the textile material, particularly acid emulsion polymers prepared from organic acids having reactive points of unsaturation. These treating polymers are known as soil-release agents.

The term "soil-release" in accordance with the present invention refers to the ability of the fabric to be washed or otherwise treated to remove soil and/or oily materials that have come into contact with the fabric. The present invention does not wholly prevent the attachment of soil or oily materials to the fabric, but hinders such attachment and renders the heretofore uncleanable fabric now susceptible to a successful cleaning operation.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased the fabric had a tendency to become stiffer and lose the desirable hand characteristic of the fabric. Thus, the upper limit on the amount of soil-release polymer to be used is determined by economics and the resulting adverse effect on the fabric. Fabrics with a heavy application of soil-release polymer do not have the same desirable appearanace and hand as the same fabrics without the soil-release coating. Furthermore, practically speaking, there is a set range of soil-release agent that can be applied, dictated by commercial success.

Some soil-release polymers are effective fabric treating agents even at very low levels on the fabric, at which levels the appearance and hand of the fabric are not adversely affected. Thus, an ideal method of treating a synthetic fiber containing fabric would be to reapply a very small amount of soil-release polymer to the fabric each time the fabric is washed.

Certain polycarboxylate polymers, such as those hydrolyzed acrylamide polymers and certain polymers of methacrylic acid with ethyl acrylate, are very effective soil-release agents at low levels on the fabric. However, these polymers cannot be deposited onto fabrics from dilute solution, as the polymers are so soluble in water that they will not deposit onto the fabric from dilute solution.

Other polymers which have been effective as anti-soil redeposition agents are polyesters containing acid groups or substituent groups which can be water soluble. French Patent No. 1,499,508 describes such polyesters which result from the polycondensation of phthalic acid with a low molecular weight glycol and a polyoxyalkylene glycol to yield polyesters containing hydrophobic units consisting of chains of phthalic acid/low molecular weight glycol and hydrophilic units from the polyalkylene glycol groups. The linking bond between the hydrophobic and hydrophilic units is provided by the ester group formed from an acid group and an alcohol group. The polyester products obtained have a relative viscosity of between 1.1 and 1.5.

There still exists a need in the textile industry for a finishing compound which provides outstanding renewable soil-release, anti-soil redeposition and anti-static characteristics to the textile substrate which is water dispersible and obviates all of the aforementioned disadvantages associated with known soil-release, anti-soil redeposition and anti-static agents.

SUMMARY OF THE INVENTION

In accordance with the present invention there are provided hydrophilic polyurethane compositions containing both hydrophobic and hydrophilic groups, which are easily dispersible in water and provide excellent soil-release, anti-soil redeposition and anti-static characteristics to textile substrates. The novel linear hydrophilic polyurethane composition of this invention has a relative viscosity of at least 2 and a molar ratio NCO/OH of between 0.8 and 1. It comprises the reaction product of:

(a) 10 to 70 weight percent of a polyester having a hydroxyl number of less than 120 mg of KOH/g and having an acid number of not more than 3 mg of KOH/g; and (b) 30 to 90 weight percent of an isocyanate terminated prepolymer, said prepolymer is the reaction product of a hydrophilic non-ionic macrodiol and a diisocyanate.

The provision of these novel hydrophilic polyurethane compositions and their use as soil-release, anti-soil redeposition and anti-static agents in textile substrates constitutes the principal object and purpose of this invention.

It is another object of the present invention to provide a detergent composition which contains the polyurethane compositions of this invention.

It is a further object of this invention to provide textile substrates particularly those produced of polyesters and blends of polyesters with other synthetic or natural fibers having excellent soil-release, anti-soil redeposition and anti-static properties.

It is still a further object of this invention to provide a method of rendering the excellent soil-release, anti-soil redeposition and anti-static properties to textile substrates which comprises washing the textile substrate in a detergent composition which contains the polyurethane compositions of this invention.

Various other objects and advantages of this invention will become apparent to those skilled in the art from the accompanying description and disclosure.

DETAILED DESCRIPTION AND PREFERRED EMBODIMENTS

The novel polyurethane polymers of this invention are generally prepared by a multi-stage process. In these preparations, the base polyester and the isocyanate terminated prepolymer are synthesized separately, then admixed and reacted together forming the polyurethane polymer of desired structure and molecular weight. Preferably, it is desirable to obtain polyurethane polymers having a high molecular weight, i.e., a relative viscosity of at least 2. Batch or continuous preparative techniques can be used.

In a batch process, the first stage involves the preparation of the base polyester having terminal hydroxyl groups and having a hydroxyl number of less than 120 mg of KOH/g and an acid number of not more than 3 mg of KOH/g and which is obtained in the known manner of preparing polyesters. Generally, any known polyesterification technique may be used. For example, reacting at least one diacid, diester or anhydride with at least one low molecular weight diol which does not confer a marked non-ionic hydrophilic character on the polyester, would be typical of the reactions intended. The reaction can be conducted at atmospheric pressure and at a temperature sufficient to maintain the polyester in a liquid state.

In another reactor the isocyanate terminated prepolymer is prepared by reacting at least one non-ionic hydrophilic macrodiol with at least one diisocyanate. The reaction is preferably conducted in a nitrogen atmosphere at a temperature of between 25° and 70° C. in order to maintain the isocyanate terminated prepolymer in a liquid state. The prepolymer is then added and admixed to the base polyester in the first reactor held at a temperature between 150° and 200° C. until the viscosity becomes constant which indicates that the reaction is complete. It is preferred to control the viscosity of the polyurethane for ease of operation and handling. The relative molar quantity of diisocyanate to be used relative to the overall quantity of macrodiol and of the base polyester depends on the molecular weight of the polyurethane final polymer. Generally, this amount of diisocyanate ranges from 2 to 15 weight percent. It is possible to provide polyurethane polymers having a relatively viscosity of 4 but polymers having a relative viscosity of at least 2 are preferred.

Relative viscosity means the ratio of the flow time of a given volume of a 1 weight percent solution of the polyurethane polymer in o-chlorophenol through a calibrated capillary tube, to the flow time of the same volume of o-chlorophenol through the same apparatus at 25° C.

In another embodiment of this invention, the reaction process can be carried out continuously. In this mode of operation the base polyester polymer and the isocyanate terminated prepolymer are mixed by metering pumps and the resulting reaction mixture directed to a conveyor coated with a material to which the resultant polyurethane polymer does not adhere. A suitable material for this purpose is polytetrafluoroethylene, for example, TEFLON, a registered tradename of E. I. DuPont de Nemours & Co..

By way of a non-limiting theory the structural features of the polymer chain may explain the surprising characteristics of the novel polyurethane compositions of this invention. The bond between the hydrophobic units and the hydrophilic units in the polymer chain is provided by the NCO group, thus of course providing both hydrophilic and hydrophobic properties to the polymer.

For preparing the base polyester according to this invention, dibasic carboxylic acids of the formula

HOOC—R—COOH wherein R is a bivalent organic radical selected from the group consisting of saturated and unsaturated alkylene and arylene having from 3 to about 20 carbon atoms are suitable. More specifically, dibasic carboxylic acids, such as adipic, fumaric, itaconic, maleic, phthalic, isophthalic, terephthalic, sebacic, suberic and succinic acids are useful. The anhydrides of these acids, as well as, their lower alkyl diesters such as methyl, ethyl, propyl and butyl diesters and the like can also be used. A preferred dibasic carboxylic acid reactant is dimethyl terephthalate.

Suitable diols for preparing the base polyester are diols of the formula

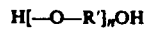

H[—O—R']$_n$OH wherein R' is a bivalent organic radical selected from the group consisting of alkylene and cycloalkylene having 2 to about 7 carbon atoms and wherein n indicates the degree of polymerization and ranges from about 1 to about 8 and which preferably has a molecular weight not exceeding 300. Illustrative of suitable diols are ethylene glycol, propane-1,2-diol, dipropylene glycol, diethylene glycol, butane-1,4-diol, hexane-1,6-diol, hexane-1,6-diol, neopentyl glycol, cyclohexane diol and dicyclohexane diol propane. A preferred diol is ethylene glycol.

The preferred base polyesters according to this invention are prepared from terephthalic acid or one of its diester derivatives. The polyester have an average molecular weight of between 1,000 and 4,000, which corresponds to a hydroxyl number $I_{OH}$ of between 25 and 120 mg of KOH/g.

In another embodiment in order to impart a slight ionic character to the base polyester, a sulfonated carboxylic diacid such as 5-sulfo-isophthalic acid or the methyl diester thereof, may be added during the preparation of the base polyester. Generally, the molar quantity of sulfonated diacid to the total molar quantity of diacids used in such preparation is between 0 to 15%.

The non-ionic hydrophilic macrodiols used in accordance with this invention for preparing the isocyanate terminated prepolymer are predominantly difunctional, i.e., they contain two hydroxyl groups in the molecule, and preferably have a molecular weight of from 300 to 6,000 and more preferably from 600 to 4,000.

The isocyanate terminated prepolymer according to this invention can be prepared with the low molecular weight diisocyanates known to the art of polyurethane chemistry, including aliphatic, aromatic or cycloaliphatic diisocyanates, such as, for example, 2,4- and 2,6-toluene diisocyanate, 1,6-hexamethylene diisocyanate, isophorone diisocyanate, di-(isocyanatophenyl)methane, di-(isocyanotocyclohexyl)-methane, diphenylmethane-4,4'-diisocyanate, 3,3'-dimethyl-4,4'-bis-phenylene diisocyanate, 4,4'-methylene bis (cyclohexylisocyanate) and 3,3'-dimethyl-4,4'-diphenyl methane diisocyanate. The preferred diisocyanates are 1,6-hexamethylene diisocyanate, 2,4-toluene diisocyanate or preferably mixtures thereof with 2,6-toluene diisocyanate wherein the mixture contains up to about 35 weight percent of the 2,6-isomer.

The invention will be further illustrated by the following non-limiting examples. Unless otherwise indicated, all parts are by weight.

POLYURETHANE SYNTHESIS

The following examples are illustrative of preparative techniques using the batch process of the present invention.

EXAMPLE I

A. Preparation of the base polyester

A reactor $R_1$ is charged with

|  | parts | molar proportions |
| --- | --- | --- |
| Dimethyl terephthalate | 333.8 | 5 |
| Adipic acid | 175.9 | 3.5 |
| Dimethyl diisophthalate 5-sodium sulphonate | 152.8 | 1.5 |
| Ethylene glycol | 245.4 | 11.5 |

The condensation reaction is carried out as a conventional polyesterification. The reactants are contacted with tetraisopropyl orthotitanate catalyst at temperatures of 220° C. and at a pressure of 20 mm of mercury.

700 parts of a polyester were obtained, the properties of the polyester were analyzed as follows:

| Acid number ($I_a$) | 0.5 mg of KOH/g |
| --- | --- |
| Hydroxyl number ($I_{OH}$) | 29.9 mg of KOH/g |
| Average molecular weight ($\bar{M}n$) | 3,746. |

B. Preparation of isocyanate terminated prepolymers

A charge of 300 parts of polyethylene glycol having a molecular weight of 600 is introduced into a reactor $R_2$, under a nitrogen atmosphere and heated to 50° C. To the heated glycol 115.5 parts of hexamethylene diisocyanate were quickly added and the resulting mixture was reacted for 1 hour at 70° C.

C. Preparation of the polyurethane

The reactor $R_1$ is cooled and maintained at 190° C. while the isocyanate terminated prepolymer of reactor $R_2$ is introduced into reactor $R_1$ over a period of 30 minutes, and the reactant mixture of the prepolymer and the base polyester is reacted for about 45 minutes at the same temperature. The reaction yields 1,115.5 parts of a polyurethane having a relative viscosity of 2.05.

EXAMPLE II

A. Preparation of the base polyester

A reactor $R_1$ is charged with:

|  | parts | molar proportions |
| --- | --- | --- |
| Dimethyl terephthalate | 257.4 | 8.5 |
| Dimethyl isophthalate 5-sodium sulphonate | 69.3 | 1.5 |
| Ethylene glycol | 241.7 | 25 |

The condensation was conducted at a temperature of 240° C. and a pressure of 20 mm of mercury. The reaction product yielded 330 parts of a polyester. The properties of the polyester were analyzed to be as follows:

| Acid number ($I_a$) | 0 |
| --- | --- |
| Hydroxyl number ($I_{OH}$) | 57.4 mg of KOH/g |
| Number-average molecular weight ($\bar{M}n$) | 1,951. |

B. Preparation of isocyanate terminated prepolymers

A charge of 670 parts of polyethylene glycol of molecular weight 4,000 are introduced into a reactor $R_2$ under a nitrogen atmosphere and heated to 70° C. To the heated glycol 58 parts of toluene diisocyanate (a commercial mixture of the 2,4 and 2,6 isomers in proportions of 80 percent and 20 percent, respectively), are quickly added and the resulting mixture was reacted for about 30 minutes at 70° C.

C. Preparation of the polyurethane

Following the procedure of Example I, the prepolymer, prepared in Example IIB, is added to the polyester of Example IIA. The reaction yields 1,058 parts of a polyurethane having a relative viscosity of 2.1.

EXAMPLE III

As described in Example IC, a prepolymer with terminal isocyanate groups prepared by reacting 750 parts of polyethylene glycol of molecular weight 1,500 and 109 parts of toluene diisocyanate (a commercial mixture as described previously), is introduced into 250 parts of the polyester prepared in Example IIA. The reaction yields 1,109 parts of a polyurethane having a relative viscosity of 2.31.

EXAMPLE IV

A. Preparation of the base polyester

A polyester is prepared according to the method described in Example I from the following components:

|  | parts | molar proportions |
|---|---|---|
| Dimethyl terephthalate | 236.9 | 10 |
| Ethylene glycol | 227.1 | 30 |

The polyesterification is conducted at 240° C. under a pressure of 20 mm of mercury. The reaction yields 250 parts of a polyester. The properties of the polyester were determined to be as follows:

| Acid number ($I_a$) | 0 |
|---|---|
| Hydroxyl number ($I_{OH}$) | 60.9 mg of KOH/g |
| Number-average molecular weight ($\overline{M}n$) | 1,839. |

B. Preparation of isocyanate terminated prepolymers

The prepolymer is prepared from: 750 parts of polyethylene glycol of molecular weight 1,500 and 111 parts of toluene diisocyanate (the commercial mixture previously described).

The reaction conditions are the same as those described in Example IB.

C. Preparation of the polyurethane

Reacting the prepolymer described in Example IVB with the polyester of Example IVA, yields 1,111 parts of a polyurethane having a relative viscosity of 3.13.

EXAMPLE V

A. Preparation of the base polyester

A polyester is prepared according to the method described in Example I from the following reactants:

|  | parts | molar proportions |
|---|---|---|
| Dimethylterephthalate | 236.9 | 10 |
| Ethylene glycol | 227.1 | 30 |

The polyesterification is conducted at 240° C. under atmospheric pressure. The reaction yielded 250 parts of a polyester. The properties of the polyester were determined as follows:

| Acid number ($I_a$) | 0.7 mg of KOH/g |
|---|---|
| Hydroxyl number ($I_{OH}$) | 116.1 mg of KOH/g |
| Number-average molecular weight ($\overline{M}n$) | 965 |

B. Preparation of isocyanate terminated prepolymers

The prepolymer is prepared by reacting 3,920 parts of polyethyelene glycol of molecular weight 1,500 with 575 parts of toluene diisocyanate (the commercial mixture previously described).

The reaction conditions are the same as those described in Example IB.

C. Preparation of the polyurethane

Reacting the prepolymer described in Example VB with the polyester of Example VA yields 4,745 parts of a polyurethane with a relative viscosity, measured as previously indicated, at 2.05, are obtained.

EXAMPLE VI

A. Preparation of the base polyester

The polyester was prepared according to the procedure which is described in Example I using the following starting materials:

|  | parts | molar proportions |
|---|---|---|
| Dimethylterephthalate | 2.876 | 14.8 |
| Dimethylsulfoisophthalate | 775 | 2.6 |
| Ethylene glycol | 3.245 | 52.3 |
| Polyoxyethylene glycol (molecular wt. 300) | 1.744 | 5.8 |

The polyesterification is carried out at a temperature of 220° C. under a pressure of 5 mm of mercury.

5.170 parts of polyester were thus obtained having the following characterstics:

| Acid number ($I_a$) | 1 |
|---|---|
| Hydroxyl number (IOH) | 29 mg KOH |
| Average molecular weight ($\overline{M}n$) | 3.860 |

B. Preparation of the isocyanate terminated prepolymers

The prepolymers were prepared from 5,000 parts of polyethylene glycol having a molecular weight of 1,500. This starting material was heated to a temperature of 120° C. under a reduced pressure of 20 mm mercury, and this temperature was maintained for one hour. Then the mixture was brought back to atmospheric pressure and a temperature of 60° C., 2.5 g of paratoluene sulfonic acid was added. After agitating the mixture for 10 minutes, 746.5 g of toluene diisocyanate were added as one portion very rapidly, the temperature rose spontaneously to 75° C. and the mixture was allowed to react at this temperature for 1 hour.

C. Preparation of the polyurethane 56.5 g of monoethyl ether of diethylene glycol were added to the polyester which was prepared at 220° C. Then the prepolymer which was kept at a temperature of 75° C. was introduced over a period of 15 minutes. The mixture was allowed to react at a temperature of 190°-200° C. for 1 hour.

Thus, 10 to 870 parts of a polyurethane the viscosity of which was determined as described above, was 2.02.

The properties of the polyurethanes obtained in the Examples are summarized and compared in Table I.

TABLE 1

BASE POLYESTERS

| Examples | Molar Compositions | | | | | Properties | | |
|---|---|---|---|---|---|---|---|---|
| | DMT | AA | DMSIP | EG | R % | $I_A$ | $I_{OH}$ | Mn |
| 1 | 5 | 3.5 | 1.5 | 11.5 | 15 | 0.5 | 29.9 | 3746 |
| 2 | 8.5 | 0 | 1.5 | 25 | 15 | 0 | 57.4 | 1951 |
| 3 | 8.5 | 0 | 1.5 | 25 | 15 | 0 | 57.4 | 1951 |
| 4 | 10 | 0 | 0 | 30 | 0 | 0 | 60.9 | 1839 |
| 5 | 10 | 0 | 0 | 30 | 0 | 0.7 | 116.1 | 965 |

DMT    dimethyl terephthalate  
AA    adipic acid  
DMSIP    dimethyl isophthalate 5 sodium sulphonate  
EG    ethylene glycol  
R %    ratio of the molar quantity of sulphonated diacid to the total molar quantity of diacids involved in the composition of the polyester

POLYURETHANES

| Examples | % Composition by Weight | | | | | Properties | |
|---|---|---|---|---|---|---|---|
| | Polyester % | PEG Mn | PEG % | Diisocyanate | % | Prepolymer % | vr |
| 1 | 62.7 | 600 | 26.9 | HMDI | 10.3 | 62.7 | 2.05 |
| 2 | 31.2 | 4000 | 63.3 | TDI | 5.5 | 68.8 | 2.1 |
| 3 | 22.6 | 1500 | 67.6 | TDI | 9.8 | 77.4 | 2.31 |
| 4 | 22.6 | 1500 | 67.6 | TDI | 9.8 | 77.4 | 2.13 |
| 5 | 5.27 | 1500 | 82.6 | TDI | 12.13 | 94.73 | 2.05 |

PEG    polyethylene glycol  
HMDI    hexamethylene diisocyanate  
TDI    toluene diisocyanate  
vr    relative viscosity

TEXTILE TREATMENTS

The novel polyurethane polymers of the present invention form a hydrophilic film on the fibers upon drying, and afford soil releasability, anti-static properties and anti-soil redeposition at that point. Each subsequent treatment serves to enhance the soil-release characteristics of the fabric substrate. Since the soil-release finish can be applied with each laundering, the soil-release effect is not lost with repeated washings.

The novel polyurethane compositions of the present invention can be used to treat a wide variety of textile materials made exclusively from natural or synthetic materials, as well as from blends of natural and synthetic fibers. Examples of natural fibers which can be used are wool and cotton. Examples of synthetic fibers which can be successfully treated with the compositions of this invention include those manufactured from polyamide, acrylic and polyester fibers. Blends of natural and synthetic fibers also employed in the practice of this invention include polyester/cotton, polyester/wool, nylon/cotton, inter alia. Cellulose fibers such as viscose, regenerated cellulose, etc. may also be combined with cellulosic fibers. The novel polyurethane compositions of the present invention are most effective on fabrics of pure polyester and blends of polyester/cotton.

Polyester fibers are hydrophobic and thus prevent the ingress of water that is necessary for cleaning the fabric, and also possess an electrical charge that attracts soil particles. The polyurethane polymers of the present invention impart a hydrophilic character to the polyester fibers on which they are deposited.

The deposition of the polyurethane polymers according to the invention can be effected by any conventional method. For example, the deposition can be effected by a finishing process carried out on the raw fabric by padding or spraying after dyeing, or on the textile article after washing by the user. Preferably, the products are deposited during the conventional laundering operation. The polyurethane polymers according to the invention can be incorporated into the detergent compositions or separately introduced into the wash cycle or preferably into the rinse cycle. The subsequent dilution with water thereafter yields a dilute aqueous dispersion of the same.

The polyurethane polymers will generally be employed in amounts such that the concentration in an aqueous dispersion will be about 0.001% to 20 weight percent, and preferably about 0.002% to 0.05 weight percent.

When the polyurethane polymers of this invention are present in dilute aqueous dispersions into which the polyester or polyester-blend fabrics are immersed, the polyurethane polymers are absorbed onto the polyester fiber forming a hydrophilic film which remains on the fibers after the fabric is removed from the solution and dried. This film makes the polyester fibers more wettable and thus oily soils and stains deposited on the fabric prior to the next laundering are more easily removed in said laundering than if the soil-release agent were not present on said polyester fibers. In addition, the novel polyurethane polymers of this invention impart anti-static properties to the textile fiber.

The polyurethane polymers according to this invention can be incorporated into any type of anionic, non-ionic, cationic, ampholytic or zwitter-ionic detergent composition.

The following may be cited as examples of anionic surface active agents which can be used within the compositions according to the present invention:

alkali metal soaps such as sodium- or potassium salts of saturated or unsaturated fatty acids having 8 to 24, preferably 14 to 20, carbon atoms or derivatives of aminocarboxylic acids such as sodium N-lauryl sarconisate or sodium N-acylsarconisate, alkali salts of alkyl-, aryl-, or alkylaryl sulfonates. Suitable alkylbenzene sulfonates are, for example, sulfonates of the formula $RC_6H_4SO_3M$, wherein R represents an alkyl group containing 9 to 13 carbon atoms. Preferably, a nonyl-, dodecyl-, or tridecyl group and M represents hydrogen, sodium, ammonium or triethanol amine. Suitable alkylnaphthlene sulfonates are, for example, sulfonates of the formula $R\text{-}C_{10}H_6SO_3Na$, wherein R is a nonyl radical. Other suitable sulfonates are N-acyl-N-alkyltaurates of the formula

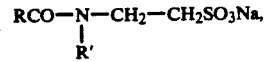

wherein R is an alkyl group containing 11 to 18 carbon atoms and R' is methyl or ethyl such as, for example, the sodium salts of N-oleoyl-N-methyl-tauric acid or N-palmitoyl-N-methyl-tauric acid, β-sulfoethyl esters of fatty acids, for example, of lauric acid, myristic acid or stearic acid; alkenyl sulfonates containing 12 to 24 carbon atoms which are obtained by sulfonated α-olefins, such as, dodecene-1, tetradecene-1, hexadecene-1, octadecene-1, eicosene-1 or tetracosene-1, by means of sulfuric acid anhydride.

sulfates and sulfated compounds, for example, such alkyl sulfates of the formula $ROSO_3M$, wherein R represents an alkyl- or alkenyl group containing 8 to 16 carbon atoms, preferably a lauryl-, cetyl-, oleyl- or myristyl group, and M represents sodium, potassium, ammonium, diethanol amine, or triethanol amine; sulfated natural fatty oils and fats; disodium salt of sulfated oelic acid; sulfated alkanol amides, such as, for example, the compound $C_{11}H_{23}CONHCH_2CH_2OSO_3Na$; ethyl-, propyl-, butyl-, or pentyl esters of sulfated oleic or ricinoleic acid; ethoxylated and sulfated alkyl phenols of the formula $RC_6H_4(OCH_2CH_2)_n-OSO_3M$, wherein R is a nonyl-, or dodecyl group and M is sodium, ammonium or triethanol amine, ethoxylated and sulfated alcohols of the formula $R(OCH_2CH_2)_nOSO_3M$, wherein R is a lauryl or myristyl group and M is as defined above.

phosphates of optionally ethoxylated fatty alcohols. As examples, there may be cited alkylorthophosphates and -poly phosphates wherein the alkyl group may contain up to 10 carbon atoms, such as a hexyl-, octyl-, 2-ethylhexyl- or decyl group.

Generally speaking, suitable nonionic surface active agents are condensation products of alkylene oxides with an aliphatic or alkyl aromatic organic compound. Especially suited are the following:

ethoxylated alkyl phenols for example, condensation products such as 5 to 25 moles of ethylene oxide per mole of alkyl phenol, wherein the alkyl group may be straight or branched and contains 6 to 12 carbon atoms, in particular, nonyl phenol which is condensed with about 10 to 30 moles of ethylene oxide per mole of phenol; dinonyl phenol which is condensed with 15 moles of ethylene oxide per mole of phenol; docecyl phenol which is condensed with 12 moles of ethylene oxide per mole of phenol.

ethoxylated aliphatic alcohols which are obtained by condensation of straight or branched fatty alcohols containing 8 to 22 carbon atoms with ethylene oxide, for example, the condensation product of about 15 moles of ethylene oxide with 1 mole of tridecanol or coprah alcohol, myristyl alcohol condensed with 10 moles of ethylene oxide.

carbon acid amides, such as, for example, diethanol amides of optionally polyethoxylated fatty acids like lauric acid or coconut oil.

polyethoxylated and polypropoxylated fatty alcohols.

As cationic surface agents, there may be used N-oxides of fatty alkyl amines corresponding to the formulae

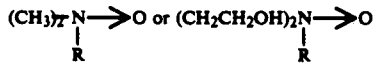

wherein R represents a cetyl, decyl-, lauryl-, myristyl-, stearyl- or oleyl groups.

Finally, as amphoteric surface active agents, there are cited alkyldimethylbetains of the formula:

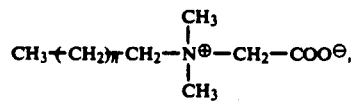

alkylamidopropyldimethylbentains of the formula:

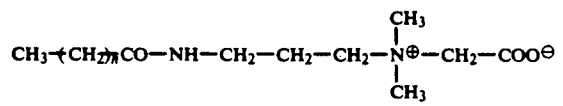

alkyltrimethylsulfobetains of the formula:

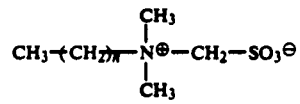

Among the above-cited surface active agents, sodium alkylbenzene sulfonates, sodium stearate, sulfates of fatty alcohols, sulfates of polyethoxylated fatty alcohols, and polyethoxylated fatty alcohols are particularly suited and preferably are used within the detergent compositions.

The various anionic, nonionic, cationic and amphoteric, which are cited above as illustrative examples only, may be used singly or in mixtures.

The detergent compositions may further comprise builders which serve to request the calcium- and magnesium ions which are present in the water.

As examples of adjuvant alkali salts which can be used for this purpose, carbonates, silicates, borax, phosphates and polyphosphates may be cited. More precisely, pentasodium, tripolyphosphate, tetrasodium- or tetrapotassium pyrophosphate and trisodium orthophosphate are preferred.

The following adjuvant organic alkali salts may also be used:

sodium salts of amino poly carbon acids, such as, nitrilotriacetic acid, ethylene diamine, tetracetic acid, diethylene triamine pentacetic acid, hydroxyethylethylene diamine triacetic acid or dihydroxyethyl glycine.

hydroxy carbon acids or their salts, such as citric acid, tartaric acid, gluconic acid or saccharic acid.

sodium oxydiacetate organophosphoric compounds, such as, aminoalkylidene phosphonic acids, in particular, nitrilotrismethylene triphosphonic acid and hydroxyethylidenediphosphonic acid.

The above-cited builders may be used singly but preferably mixtures of such builders are used. Preferred are sodium disilicate, sodium carbonate, trisodium orthophosphate, tetrasodium pyrophosphate and pentasodium tripolyphosphate.

Further to surface active agents and builder detergent compositions usually contain a certain number of conventional ingredients in varying amounts. As examples of such ingredients, there may be cited, for example, foam inhibiting agents, such as, polysiloxanes, mineral salts, such as, sodium sulfate, bleaching agents, such as hydrogen peroxide and its hydrates, peroxides and persalts, singly or in mixture with precursors of bleaching agents and other anti-redeposition agents, such as, carboxymethylcellulose, carboxymethylhydroxyethylcellulose, polyvinyl alcohol, copolymers of maleic acid and vinyl ether, acrylic acid, copolymers of acrylic acid and vinylic monomers, water soluble sulfonated polyesters, fluorescent agents, such as, stilbines, furanes, thiophenes, as well as small amounts of perfumes, colorants and enzymes.

The polyurethanes according to the present invention are used in amounts of about 0.1 to about 5% by weight within detergent compositions which contain at least about 5 to about 50% by weight of a surface active agent. Preferred are detergent compositions containing about 5 to about 25% of a surface active agent and about 0.5 to about 3% of said polyurethane. Particularly suitable are anionic surface active agents, nonionic surface active agents and mixtures thereof.

About 10 to about 60%, preferably about 10 to about 40% by weight of a builder of 0 to about 30%, preferably about 10 to about 20% by weight of a bleaching agent may be added to the detergent composition.

The following examples of detergent compositions are illustrative and non-limiting.

| Composition A: | |
|---|---|
| Straight alkylbenzene sulfonate (the alkyl groups containing about 12 carbon atoms) | 6.2 |
| Natural tallow soap | 4.4 |
| Fatty alcohol containing 18 carbon atoms and 11 ethylene oxide units | 3.2 |
| Sodium tripolyphosphate | 41.3 |
| Sodium sulfate | 12.7 |
| Sodium perborate | 23.2 |
| Carboxymethyl cellulose | 0.5 |
| Humidity | 8.5 |
| Composition B: | |
| Fatty alcohol containing 14 carbon atoms and 7 ethylene oxide units | 11 |
| Sodium orthophosphate | 4 |
| Sodium pyrophosphate | 10 |
| Sodium tripolyphosphate | 26 |
| Sodium disilicate | 8 |
| Sodium sulfate | 13 |
| Sodium perborate | 20 |
| Carboxymethyl cellulose | 0.5 |
| Foam inhibiting agent (polymethyl siloxane) | 0.5 |
| Humidity | 7 |
| Composition C: | |
| Straight alkylbenzene sulfonate (the alkyl group containing about 12 carbon atoms) | 11 |
| Coprah acid soap | 10 |
| Sodium tripolyphosphate | 40 |
| Sodium disilicate | 5 |
| Sodium sulfate | 20 |
| Enzyme | 1 |
| Humidity | 13 |
| Composition D: | |
| Straight alkylbenzene sulfonate (the alkyl group containing about 12 carbon atoms) | 13.5 |
| Sodium stearate | 1.3 |
| Fatty alcohol containing 18 carbon atoms and 11 ethylene oxide units | 3.7 |
| Sodium orthophosphate | 0.9 |
| Sodium pyrophosphate | 5.8 |
| Sodium tripolyphosphate | 26.5 |
| Sodium disilicate | 4.5 |
| Sodium carbonate | 0.6 |
| Sodium sulfate | 33 |
| Humidity | 10.2 |
| Composition E: | |
| Straight alkylbenzene sulfonate (the alkyl group containing about 12 carbon atoms) | 9.2 |
| Sodium stearate | 6.7 |
| Fatty alcohol containing 18 carbon atoms and 11 ethylene oxide units | 4.8 |
| Sodium orthophosphate | 1.1 |
| sodium pyrophosphate | 3.4 |
| Sodium tripolyphosphate | 30.2 |
| Sodium disilicate | 6.6 |
| Sodium carbonate | 1.2 |
| Sodium sulfate | 14.2 |
| Sodium perborate | 11.4 |
| Humidity | 11.2 |

The temperature of the aqueous medium which is used during the washing is not critical since the polyurethanes according to the present invention are effective at temperatures from about 0° to about 100° C., preferably about 20° to about 90° C.

The polyurethanes according to the present invention may also be incorporated into a rinsing liquor and be applied to the textile during the rinsing operation within a washing process. A rinsing liquor may contain from about 0.5 to about 10%, preferably about 1 to about 5% by weight of the polyurethane in the treating bath.

The polyurethane polymers according to this invention have an elastomeric character which is proportional to the length of the macrodiol chain present in the structure of the polymer chain. Preferably, in order to form powders which are more easily incorporated into detergent composition fillers are added. Suitable fillers are materials having very fine particle size, easily dispersible and have a high absorption capacity. Preferred filling materials are kaolin, sodium aluminosilicates and silica. Most preferred are synthetic silica or sodium aluminosilicates which are commercially available. The synthetic silica and sodium aluminosilicates are neutral or slightly basic. These fillers are made up of elementary particles having diameters between 50 and 1,000 Å, a specific surface area, measured by the BET method, between 50 and 600 m$^2$/g and a porosity of from 50 to 200 cc/100 g, measured with a mercury porosity measuring apparatus, in the range of pore diameters from 400 Å to 2.5μ. The oil adsorpotion measured using dioctyl phthalate, which is greater than 70 cc/100 g, can attain 250 cc/100 g of the sodium aluminosilicates and 460 cc/100 g of silica.

Generally, 10 to 90 parts by weight of filler can be used per 90 to 10 parts by weight of polyurethane. However, in order to obtain a powder which is most efficiently dispersible in the wash liquor preferably 40 to 70 parts by weight of filler are incorporated with 60 to 30 parts by weight of polymer.

The mineral filler is added to the polyurethane polymer and the resulting mixture is then finely ground. In the case of polyurethane polymers with high degrees of hydrophilic character an aqueous dispersion containing 15 to 20 percent by weight of such hydrophilic polyurethane polymers is stirred and the desired quantity of filler is added then dried and finely ground. This method is preferable with polyurethane polymers having ionic groups which provide a concentrated aqueous dispersion.

The other ingredients can be incorporated by any conventional means such as, for example, addition in the form of an emulsion in the course of spraying or granulating pulverulent compositions, or by addition in the form of granules to the said compositions. They can also easily be introduced into liquid detergents for domestic or industrial use, in accordance with known techniques.

In the examples which follow, the properties of the polyurethane polymers according to this invention as excellent textile treating agents are demonstrated.

EXAMPLE VII

A. Converting a pre-melted polyurethane to a powder

Into a ball mill 1,000 parts of TIX-O-SIL 38 (a synthetic silica marketed by Societe SIFRANCE) are introduced and then heated to 200° C. under a nitrogen atmosphere. The temperature is maintained and 1,000 parts of a melted polyurethane prepared in Example III are added. This resulting mixture is milled, resulting in a finely divided powder.

B. Converting an aqueous dispersion polyurethane to a powder

Into a vessel equipped with a stirrer 1,000 parts of polyurethane prepared in Example I are added to 4,000 parts of water maintained at 60° C. with vigorous stirring. Then 1,000 parts of TIX-O-SIL 38 are added. The paste obtained is dried in a ventilated oven at 60° C., then ground.

In the following example, the compatibility and storage stability of polyurethanes according to this invention with a conventional detergent composition is demonstrated.

EXAMPLE VIII

In a HENRY mixer polyurethane composition powder of Example VIA is incorporated into the following conventional detergent composition in an amount equivalent to 3 weight percent based on the detergent composition.

| | |
|---|---|
| Linear alkylbenzenesulphonate (alkyl containing approximately 12 carbon atoms) | 9.9% |
| Alcohol containing 16 to 18 carbon atoms and having approximately 15 ethylene oxide units | 5.0% |
| Natural tallow soap | 6.6% |
| Sodium tripolyphosphate | 34.0% |
| Sodium orthophosphate | 0.9% |
| Sodium pyrophosphate | 2.3% |
| Sodium perborate | 22.9% |
| Sodium sulphate | 4.8% |
| Sodium disilicate | 5.4% |
| Carboxymethylcellulose | 0.6% |
| Water | 7.6% |

The resulting polyurethane-containing detergent composition is placed into an oven maintained at a temperature of 40° C. for 4 weeks.

The stability and compatibility of the detergent mixture with the polyurethane according to this invention, is then tested in the following manner:

Two strips (20×115 cm) of polyester/cotton (67/33) fabric having a light reflectance C are washed in a Miele 421 S automatic machine (color program - 60° C.) with 5 g/l of the polyurethane-containing detergent composition described above. The strips of fabric are subsequently dried at ambient temperature and cut up into squares (12×12 cm). The squares are separately soiled with either dirty crankcase oil or Spangler soiling agent (see J. Am. Oil Chem. 1965-42, 723-727) or tomato concentrate or lipstick, providing 6 test swatches for each type of stain. The stains are then set by leaving test swatches for one hour in an oven at 60° C. The light reflectance R of the swatches are measured on an Elrepho apparatus with an FMY/C filter for the dirty crankcase oil and the Spangler soiling agent and an FMX/C filter for the tomato concentrate and the lipstick.

Thereafter the test swatches are tacked onto ten clean cotton dusters, washed according to the procedure described above, and dried. The light reflectance $R_1$ is then measured. The effectiveness E as an anti-soiling agent of the polyurethane polymer tested is calculated from the percentage of stains removed by the formula:

$$E \text{ in } \% = \frac{R_1 - R}{C - R} \times 100$$

For each polyurethane-containing detergent tested the average of the percentage removal of different stains is calculated. The results of these tests are recorded in Table II.

TABLE II

| Polymer tested | PU₃ | | PU₄ | |
|---|---|---|---|---|
| X % | 83.5 | 66.5 | 50 | 55.5 |
| I | 74 | 74 | 74 | 74 |
| F | 73 | 73 | 67 | 66 |

PU$_i$: indicates the polyurethane described in the Example "i"
X %: indicates the amount by weight of TIX-O-SIL 38 incorporated into the polyurethane, expressed per 100 parts by weight of mixture (filler + polyurethane)
I: indicates the average of the percentage removal of different stains before storage of the polymer
F : indicates the same percentage, after storage of the polymer for 4 weeks at 40° C.

The data in Table III demonstrates the stability resulting from the high molecular weight of the polyurethanes, according to this invention compared with prior art polyester compositions when they are stored. In Table III vr indicates the relative viscosity of the polymers tested which are the polyurethane described in our Example III (PU) and the polyester described in Example II of French Patent No. 1,401,581 (PE).

TABLE III

| Polymer tested | X % | vr | I | F |
|---|---|---|---|---|
| PE | 83.5 | 1.2 | 74 | 66 |
| PU | 83.5 | 2.3 | 74 | 73 |
| PE | 50.0 | 1.2 | 74 | 59 |
| PU | 50.0 | 2.3 | 74 | 67 |

The following example illustrates the polyurethanes according to this invention used together with an anionic detergent to enhance the anti-soiling properties thereof.

EXAMPLE IX

Two strips (20×115 cm) of polyester/cotton (67/33) fabric having a light reflectance C are washed in a Miele 421 S automatic machine (color program-60° C.) with 5 g/l of the conventional detergent compositions described in Example VII. A polyurethane polymer is then incorporated into the conventional detergent composition in an amount of 3 weight percent relative to the said composition. The polyurethane is incorporated either in the form of a 5 weight percent aqueous solution, or in the form of a powder. The strips of fabric are subsequently dried at ambient temperature and cut up into squares (12×12 cm). The squares are separately soiled with dirty crankcase oil or Spangler anti-soiling agent or tomato concentrate or lipstick providing 6 test swatches for each type of stain. The stains are then set by leaving the test swatches for one hour in an oven at 60° C. The light reflectance R of the swatches measured on an Elrepho apparatus with a FMY/C filter for the dirty crankcase oil and the Spangler soiling agent and a FMX/C filter for the tomato concentrate and the lipstick.

Thereafter the test swatches are tacked onto ten clean cotton dusters, washed according to the procedure described above, and dried. The light reflectance $R_1$ is then measured. The effectiveness E, as an anti-soiling agent of the polyurethane polymers tested is assessed from the percentage removal of stains calculated by the formula:

$$E \text{ in } \% = \frac{R_1 - R}{C - R} \times 100$$

For each polyurethane-containing detergent tested the average percentage removal of different stains is calculated. The results of these tests are recorded in Table IV:

TABLE IV

| Polymer tested | Control | PU$_1$ | PU$_2$ | PU$_3$ | PU$_4$ | PU$_5$ | PU |
|---|---|---|---|---|---|---|---|
| X % | — | 50 | 50 | 0 | 50 | 55.5 | 66.6 | 66.6 |
| E % | 45 | 75 | 75 | 74 | 76 | 74 | 73 | 51 |

The experimental error associated with this test is 2%. The designations PU$_1$, PU$_2$, PU$_3$, PU$_4$ and PU$_5$ correspond to the polyurethanes produced in the numerical examples. The designation PU represents a polyurethane not within the scope of the present invention.

This polymer is prepared according to the general method described in Example I, the properties of the polymer are as follows:

| Composition | |
|---|---|
| - Base polyester | 22.67% by weight |
| - Polyethylene glycol of molecular weight 1,500 | 68.02% by weight |
| - Toluene diisocyanate (the commercial mixture previously described) | 9.31% by weight |
| Relative viscosity : 2.63 | |

The polyester is prepared from 10 mols of adipic acid for 30 mols of ethylene glycol, the properties of the polyester being as follows:

| | |
|---|---|
| Acid number (I$_a$) | 0.5 mg of KOH/g |
| Hydroxyl number (I$_{OH}$) | 16.5 mg of KOH/g |
| Number-average molecular weight | 6,590 |

The following example illustrates the use of polyurethanes according to this invention with a non-ionic detergent.

EXAMPLE X

The tests are carried out in conditions identical to those described in Example VIII, but with the following non-ionic detergent compositions:

| | |
|---|---|
| Alcohol containing 10 to 12 carbon atoms and having an average of 5 ethylene oxide units | 9.4% |
| Sodium tripolyphosphate | 31.4% |
| Sodium orthophosphate | 1.1% |
| Sodium pyrophosphate | 7.3% |
| Sodium perborate | 26.2% |
| Sodium sulphate | 15.8% |
| Sodium disilicate | 8.5% |
| Polysiloxane (anti-foam) | 0.3% |

The results of these tests are given in Table V.

TABLE V

| Polymer tested | Control | PU$_1$ | PU$_2$ | PU$_3$ | PU$_4$ | |
|---|---|---|---|---|---|---|
| X % | — | 60 | 50 | 0 | 50 | 55.5 |
| E % | 45 | 83 | 81 | 80 | 82 | 83 |

In the following example, the anti-redeposition agent properties of the products according to this invention are demonstrated.

EXAMPLE XI

Squares (12×12 cm) of polyester/cotton (67/33) fabric are washed in a Lini-Test apparatus (ORIGINAL HANAU) for 20 minutes at 60° C. in hard water (33 French degrees of hardness) containing 0.75 g/l of the following conventional detergent composition:

| | |
|---|---|
| Linear alkylbenzenesulphonate (alkyl containing approximately 12 carbon atoms) | 8% |
| Alcohol containing 16 to 18 carbon atoms and having approximately 50 ethylene oxide units | 3% |
| Natural tallow soap | 4% |
| Sodium tripolyphosphate | 30% |
| Sodium orthophosphate | 1.5% |
| Sodium pyrophosphate | 12.5% |
| Sodium perborate | 25% |
| Sodium sulphate | 10% |
| Sodium disilicate | 6% |

Spangler soiling agent is introduced into each washing pot in the proportion of 5% relative to the weight of detergent solution. The polyurethane polymer according to this invention is added in an amount of 3 percent by weight relative to the conventional detergent composition.

The redeposition of the Spangler soiling agent on the fabric is given by the value R of the light reflectance of the fabric washed in the presence of the product according to this invention. The reflectance is measured on a Gardner apparatus (GARDNER INSTRUMENTS). As an indication, the unwashed fabric has a light reflectance equal to 85.6.

The results obtained with a polyurethane polymer corresponding to the Examples described earlier are given in Table VI.

TABLE VI

| Polymer tested | Control | PU$_1$ | PU$_2$ | PU$_3$ | PU$_4$ |
|---|---|---|---|---|---|
| X % | — | 50 | 50 | 0 | 50 | 55.5 |
| R | 67 | 79.2 | 78.4 | 82.0 | 82.4 | 81 |

The experimental error under the test conditions is 1.

In the following example, the anti-static agent properties of the products according to this invention are demonstrated.

EXAMPLE XII

Two strips (20×115 cm) of polyester fabric (Dacron type 54 TEST FABRICS INC.) are washed in a Miele 421 S automatic machine (color program-60° C.) with 5 g/l of the detergent composition described in Example VII. The polyurethane polymer tested is introduced in an amount of 3 weight percent relative to the conventional detergent composition. The fabric strips are then dried at ambient temperature and cut into discs of 10 cm diameter. The fabric discs are conditioned for 24 hours in a chamber maintained and controlled at a temperature of 22° C. and a relative humidity of 46 percent. Each of the disc samples is charged electrostatically, and the time to half discharge and three-quarters discharge is measured using an electrostatic charge meter (Creusot-Loire). The results are given in Table VII.

TABLE VII

| Product Tested | Control | PU$_2$ |
|---|---|---|
| X % | — | 50 |
| Half-discharge in seconds | 180 | 5 |
| ¾ discharge in seconds | 1,440 | 20 |

The following example illustrates the anti-soiling properties of the polyurethanes according to this invention when they are used within detergent compositions which contain single anionic or nonionic surface active agents or mixtures of several such agents.

EXAMPLE XIII

A polyester fabric (Dacron-Test Fabric Inc.) was washed without a detergent in softened water (5° TH) in an automatic washing machine at a temperature of 60° C., and then was dried at room temperature.

Test samples (10×12 cm) were washed in a Lini-Test apparatus (Original Hanau) which simulates a washing cycle at 60° C. Into each pot of 4 samples, 0.45 l of hard water (33° TH) and a detergent composition were introduced. The proportions of the different surface active agents in the detergent compositions were varied as follows:

| | |
|---|---|
| Straight alkylbenzene sulfonate (the alkyl group containing about 12 carbon atoms) | x |
| Fatty alcohol containing 16 to 18 carbon atoms and about 15 ethylene oxide units | y |
| Sodium stearate | z |
| Sodium tripolyphosphate | 1.75 g/l |
| Sodium sulfate | 0.25 g/l |
| Sodium disilicate | 0.25 g/l |
| Polyurethane of Example VI | 0.05 g/l |

The parameters x, y, z (g/l) were varied as follows:

| | x | y | z |
|---|---|---|---|
| Formulation 1 | 0 | 0 | 0.5 |
| Formulation 2 | 0 | 0.5 | 0 |
| Formulation 3 | 0 | 0.25 | 0.25 |
| Formulation 4 | 0.5 | 0.25 | 0.25 |
| Formulation 5 | 0.5 | 0.25 | 0 |
| Formulation 6 | 0.25 | 0.25 | 0 |

Two pots were used for each test. Subsequently, the fabrics were rinsed with cold water and then dried at ambient temperature on filter paper.

By means of a burette, each 4 drops of filtered crankcase oil on three of the four samples from each pot.

The samples were then kept for 1 hour in an oven at 60° C. The light reflectance R of the spots as well as the reflectance C of the unsoiled sample were then determined in an Elrepho apparatus (filter FMY/C).

The samples were washed in a Lini-Test apparatus simulating a washing cycle at 60° C., whereby each pot contained 4 samples and 0.45 liters of a solution containing 3 g/l of a conventional detergent composition such as described in Example VIII.

The samples were then rinsed with cold water and dried at ambient temperature on filter paper. The light reflectance R of the soiled and washed samples were determined. The percentage of stain elimination is calculated by the formula:

$$E \text{ in } \% = \frac{R_1 - R}{C - R} \times 100$$

The results of the test are given in the Table below:

| | E % |
|---|---|
| Formulation 1 | 70 |
| Formulation 2 | 72 |
| Formulation 3 | 72 |
| Formulation 4 | 50 |
| Formulation 5 | 46 |
| Formulation 6 | 71 |

It can be seen that the polyurethanes according to the present invention exhibit a considerable effectiveness within detergent compositions which either contain only one anionic or nonionic detergent or else a mixture of the two.

The following example illustrates the anti-soil properties of the polyurethanes according to the present invention and the influence of the concentration within a detergent composition.

EXAMPLE XIV

The tests are carried out under the same conditions as are described in Example XIII, but using the following detergent composition, wherein the percentage by weight of the polyurethane is varied:

| | |
|---|---|
| Straight alkylbenzene sulfonate (the alkyl group containing about 12 carbon atoms) | 9.5% |
| Fatty alcohol containing 16 to 18 carbon atoms and about 15 ethylene oxide units | 3.2% |
| Sodium stearate | 5.8% |
| Tripolyphosphate | 31% |
| Sodium orthophosphate | 1% |
| Sodium pyrophosphate | 3.5% |
| Sodium carbonate | 1% |
| Sodium sulfate | 9% |
| Sodium disilicate | 3% |
| Sodium perborate | 24% |
| Water | 9% |
| Polyurethane of Example VI | x % |

5 g/l of the detergent composition were used. The following results were as follows:

| x % by weight | E % |
|---|---|
| 0 | 8 |
| 0.5 | 40 |
| 1 | 70 |
| 2 | 72 |

The anti-soiling quality of the polyurethane according to this invention and the influence of the concentration are shown by the above data.

While the invention has now been described in terms of certain preferred embodiments and exemplified by way of comparative data, the skilled artisan will appreciate that various modifications, substitutions, omissions, and additions, may be made without departing from the spirit thereof. Accordingly, it is intended that the scope of the present invention be limited solely by that of the following claims.

What is claimed is:

1. A linear, hydrophilic polyurethane having a relative viscosity of at least about 2, said polyurethane comprising the reaction product of:
   (a) from 10 to 70 weight percent of a polyester having a hydroxyl number of less than 120 mg KOH/g and an acid number of not more than 3 mg KOH/g, said polyester being the condensation product of an aromatic dicarboxylic acid or ester-forming derivative thereof with a diol having a molecular weight not in excess of about 300; and (b) from 30 to 90 weight percent of an isocyanato prepolymer having NCO terminal groups, said prepolymer being the reaction product of a nonionic hydrophilic macrodiol having a molecular weight of from about 300 to about 6,000 with a diisocyanate; and (c) wherein the overall ratio of NCO/OH groups ranges from between about 0.8 and 1.

2. The linear, hydrophilic polyurethane as defined by claim 1, wherein the aromatic dicarboxylic acid comprising the polyester (a) is terephthalic acid.

3. The linear, hydrophilic polyurethane as defined by claim 1, wherein the nonionic hydrophilic macrodiol comprising the isocyanato prepolymer (b) is a polyethylene glycol.

4. The linear, hydrophilic polyurethane as defined by claim 2, wherein the nonionic hydrophilic macrodiol comprising the isocyanato prepolymer (b) is a polyethylene glycol.

5. A linear, hydrophilic polyurethane having a relative viscosity of at least about 2, said polyurethane comprising the reaction product of:

(a) from 10 to 70 weight percent of a polyester having a hydroxyl number of less than 120 mg KOH/g and an acid number of not more than 3 mg KOH/g, said polyester being the condensation product of a dicarboxylic acid or ester-forming derivative thereof with a diol having a molecular weight not in excess of about 300; and (b) from 30 to 90 weight percent of an isocyanato prepolymer having NCO terminal groups, said prepolymer being the reaction product of a nonionic hydrophilic polyethylene glycol having a molecular weight of from about 300 to about 6,000 with a diisocyanate; and (c) wherein the overall ratio of NCO/OH groups ranges from between about 0.8 and 1.

6. The linear, hydrophilic polyurethane as defined by claim 1, wherein the polyester (a) has an average molecular weight of between 1,000 and 4,000.

7. The linear, hydrophilic polyurethane as defined by claim 5, wherein the polyester (a) has an average molecular weight of between 1,000 and 4,000.

8. The linear, hydrophilic polyurethane as defined by claim 1, wherein the nonionic hydrophilic macrodiol comprising the isocyanato prepolymer (b) has a molecular weight of between 600 and 4,000.

9. The linear, hydrophilic polyurethane as defined by claim 5, wherein the dicarboxylic acid comprising the polyester (a) is selected from the group consisting of adipic acid, fumaric acid, itaconic acid, maleic acid, phthalic acid, isophthalic acid, terephthalic acid, sebacic acid, suberic acid and succinic acid.

10. The linear, hydrophilic polyurethane as defined by claim 9, wherein the said dicarboxylic acid is terephthalic acid.

11. The linear, hydrophilic polyurethane as defined by claim 5, wherein the polyester (a) comprises the condensation product of dimethyl terephthalate.

12. The linear, hydrophilic polyurethane as defined by claim 1, wherein the polyester (a) comprises the condensation product of dimethyl terephthalate.

13. The linear, hydrophilic polyurethane as defined by claim 1, wherein the diol comprising the polyester (a) is selected from the group consisting of ethylene glycol, propane-1,2-diol, dipropylene glycol, diethylene glycol, butane-1,4-diol, hexane-1,6-diol, hexane-1,6-diol, neopentyl glycol, cyclohexane diol and dicyclohexane diol propane.

14. The linear, hydrophilic polyurethane as defined by claim 1, wherein the diisocyanate comprising the isocyanato prepolymer (b) is selected from the group consisting of 2,4- and 2,6-toluene diisocyanate, 1,6-hexamethylene diisocyanate, isophorone diisocyanate, di-(isocyanotophenyl)-methane, di-(isocyanotocyclohexyl)-methane, diphenylmethane-4,4'-diisocyanate, 3,3'-dimethyl-4,4'-bis-phenylene diisocyanate, 4,4'-methylene bis(cyclohexylisocyanate) and 3,3'-dimethyl-4,4'-diphenyl methane diisocyanate.

15. The linear, hydrophilic polyurethane as defined by claim 5, wherein the diisocyanate comprising the isocyanato prepolymer (b) is selected from the group consisting of 2,4- and 2,6-toluene diisocyanate, 1,6-hexamethylene diisocyanate, isophorone diisocyanate, di-(isocyanotophenyl)-methane, di-(isocyanotocyclohexyl)-methane, diphenylmethyl-4,4'-diisocyanate, 3,3'-dimethyl-4,4'-bis-phenylene diisocyanate, 4,4'-methylene bis(cyclohexylisocyanate) and 3,3'-dimethyl-4,4'-diphenyl methane diisocyanate.

16. The linear, hydrophilic polyurethane as defined by claim 14, wherein the said diisocyanate is selected from the group consisting of 1,6-hexamethylene diisocyanate, 2,4-toluene diisocyanate and mixtures of each with 2,6-toluene diisocyanate, wherein each mixture contains up to about 35 weight percent of the 2,6-isomer.

17. The linear, hydrophilic polyurethane as defined by claim 15, wherein the said diisocyanate is selected from the group consisting of 1,6-hexamethylene diisocyanate, 2,4-toluene diisocyanate and mixtures of each with 2,6-toluene diisocyanate, wherein each mixture contains up to about 35 weight percent of the 2,6-isomer.

18. The linear, hydrophilic polyurethane as defined by claim 1, wherein the amount of diisocyanate reacted, based upon the total weight of the polyester (a) and the nonionic hydrophilic macrodiol comprising the isocyanato prepolymer (b), ranges from between 2 and 15 weight percent.

19. The linear, hydrophilic polyurethane as defined by claim 5, wherein the amount of diisocyanate reacted, based upon the total weight of the polyester (a) and the nonionic hydrophilic macrodiol comprising the isocyanato prepolymer (b), ranges from between 2 and 15 weight percent.

20. The linear, hydrophilic polyurethane as defined by claim 1, wherein the polyester (a) forming reactants further comprise up to 15 weight percent, based upon the total weight of the dicarboxylic acids, of a member selected from the group consisting of a sulfonated dicarboxylic acid or ester-forming derivative thereof, and salts thereof.

21. The linear, hydrophilic polyurethane as defined by claim 5, wherein the polyester (a) forming reactants further comprise up to 15 weight percent, based upon the total weight of the dicarboxylic acids, of a member selected from the group consisting of a sulfonated dicarboxylic acid or ester-forming derivative thereof, and salts thereof.

22. The linear, hydrophilic polyurethane as defined by claim 20, wherein said sulfonated coreactant is selected from the group consisting of sulfoisophthalic acid, sulfoisophthalic acid dimethyl ester, alkali metal salts of sulfoisophthalic acid, and alkali metal salts of sulfoisophthalic acid dimethyl ester.

23. The linear, hydrophilic polyurethane as defined by claim 21, wherein said sulfonated coreactant is selected from the group consisting of sulfoisophthalic acid, sulfoisophthalic acid dimethyl ester, alkali metal salts of sulfoisophthalic acid, and alkali metal salts of sulfoisophthalic acid dimethyl ester.

24. A detergent composition comprising (i) a surfactant and (ii) from about 0.1 to 5 weight percent of a linear, hydrophilic polyurethane having a relative viscosity of at least about 2, said polyurethane comprising the reaction product of:
(a) from 10 to 20 weight percent of a polyester having a hydroxyl number of less than 120 mg KOH/g and an acid number of not more than 3 mg KOH/g, said polyester being the condensation product of a dicarboxylic acid or ester-forming derivative thereof with a diol;
(b) from 30 to 90 weight percent of an isocyanato prepolymer having NCO terminal groups, said prepolymer being the reaction product of a nonionic hydrophilic macrodiol with a diisocyanate; and
(c) wherein the overall ratio of NCO/OH groups ranges from between about 0.8 and 1.

25. The detergent composition as defined in claim 24, wherein the diol comprising the polyester (a) has a molecular weight not in excess of about 300.

26. The detergent composition as defined by claim 25, wherein the nonionic hydrophilic macrodiol comprising the isocyanato prepolymer (b) has a molecular weight of from about 300 to about 6,000.

27. A detergent composition comprising (i) a surfactant and (ii) a linear, hydrophilic polyurethane as defined by claim 1.

28. The detergent composition as defined by claim 2, wherein the diol comprising the polyester (a) has a molecular weight not in excess of about 300.

29. The detergent composition as defined by claim 3, wherein the diol comprising the polyester (a) has a molecular weight not in excess of about 300.

30. The detergent composition as defined by claim 4, wherein the diol comprising the polyester (a) has a molecular weight not in excess of about 300.

31. The detergent composition as defined by claim 5, wherein the diol comprising the polyester (a) has a molecular weight not in excess of about 300.

32. The detergent composition as defined by claim 6, wherein the diol comprising the polyester (a) has a molecular weight not in excess of about 300.

33. The detergent composition as defined by claim 7, wherein the diol comprising the polyester (a) has a molecular weight not in excess of about 300.

34. The detergent composition as defined by claim 8, wherein the diol comprising the polyester (a) has a molecular weight not in excess of about 300.

35. The detergent composition as defined by claim 14, wherein the diol comprising the polyester (a) has a molecular weight not in excess of about 300.

36. The detergent composition as defined by claim 15, wherein the diol comprising the polyester (a) has a molecular weight not in excess of about 300.

37. The detergent composition as defined by claim 18, wherein the diol comprising the polyester (a) has a molecular weight not in excess of about 300.

38. The detergent composition as defined by claim 19, wherein the diol comprising the polyester (a) has a molecular weight not in excess of about 300.

39. The detergent composition as defined by claim 20, wherein the diol comprising the polyester (a) has a molecular weight not in excess of about 300.

40. The detergent composition as defined by claim 21, wherein the diol comprising the polyester (a) has a molecular weight not in excess of about 300.

41. The detergent composition as defined by claim 24, further comprising (iii) a detergent builder.

42. The detergent composition as defined by claim 27, further comprising (iii) a detergent builder.

43. The detergent composition as defined by claim 28, further comprising (iii) a detergent builder.

44. The detergent composition as defined by claim 29, further comprising (iii) a detergent builder.

45. The detergent composition as defined by claim 30, further comprising (iii) a detergent builder.

46. The detergent composition as defined by claim 31, further comprising (iii) a detergent builder.

47. The detergent composition as defined by claim 24, further comprising (iii) at least one adjuvant selected from the group consisting of whiteners, anti-redeposition agents, perfumes, optical brightening agents and inert fillers.

48. The detergent composition as defined by claim 24, which comprises from about 0.5 to 3 weight percent of the linear, hydrophilic polyurethane (ii).

49. The detergent composition as defined by claim 24, which comprises from about 5 to 50 weight percent of the surfactant (i).

50. The detergent composition as defined by claim 49, which comprises from about 5 to 25 weight percent of the surfactant (i).

51. The detergent composition as defined by claim 24, further comprising (iii) a mineral filler.

52. The detergent composition as defined by claim 27, further comprising (iii) a mineral filler.

53. The detergent composition as defined by claim 31, further comprising (iii) a mineral filler.

54. A dilute, aqueous dispersion of (i) water and (ii) from 0.001 to 20 weight percent of a linear, hydrophilic polyurethane having a relative viscosity of at least about 2, said polyurethane comprising the reaction product of:
(a) from 10 to 70 weight percent of a polyester having a hydroxyl number of less than 120 mg KOH/g and an acid number of not more than 3 mg KOH/g, said polyester being the condensation product of a dicarboxylic acid or ester-forming derivative thereof with a diol;
(b) from 30 to 90 weight percent of an isocyanato prepolymer having NCO terminal groups, said prepolymer being the reaction product of a nonionic hydrophilic macrodiol with a diisocyanate; and
(c) wherein the overall ratio of NCO/OH groups ranges from between about 0.8 and 1.

55. A dilute, aqueous dispersion of (i) water and (ii) from 0.001 to 20 weight percent of the linear, hydrophilic polyurethane as defined by claim 1.

56. A dilute, aqueous dispersion of (i) water and (ii) from 0.001 to 20 weight percent of the linear hydrophilic polyurethane as defined by claim 5.

57. The dilute, aqueous dispersion as defined by claim 54, comprising from 0.002 to 0.05 weight percent of the polyurethane.

58. The dilute, aqueous dispersion as defined by claim 55, comprising from 0.002 to 0.05 weight percent of the polyurethane.

59. The dilute, aqueous dispersion as defined by claim 56, comprising from 0.002 to 0.05 weight percent of the polyurethane.

60. The detergent composition as defined by claim 41, comprising from about 10 to 60 weight percent of the detergent builder.

61. The detergent composition as defined by claim 42, comprising from about 10 to 60 weight percent of the detergent builder.

62. The detergent composition as defined by claim 46, comprising from about 10 to 60 weight percent of the detergent builder.

63. The detergent composition as defined by claim 60, further comprising up to 30 weight percent of a whitener.

64. The detergent composition as defined by claim 61, further comprising up to 30 weight percent of a whitener.

65. The detergent composition as defined by claim 62, further comprising up to 30 weight percent of a whitener.

66. The detergent composition as defined by claim 24, wherein the surfactant is selected from the group consisting of an anionic surfactant, a non-ionic surfactant and mixtures thereof.

67. The detergent composition as defined by claim 27, wherein the surfactant is selected from the group consisting of an anionic surfactant, a non-ionic surfactant and mixtures thereof.

68. The detergent composition as defined by claim 31, wherein the surfactant is selected from the group consisting of an anionic surfactant, a non-ionic surfactant and mixtures thereof.

69. The detergent composition as defined by claim 66, wherein the surfactant is selected from the group consisting of sodium alkylbenzene-sulfonates, sodium stearate, sulfates of fatty alcohols, sulfates of polyethoxylated fatty alcohols, and polyethoxylated fatty alcohols.

70. The detergent composition as defined by claim 67, wherein the surfactant is selected from the group consisting of sodium alkylbenzene-sulfonates, sodium stearate, sulfates of fatty alcohols, sulfates of polyethoxylated fatty alcohols, and polyethoxylated fatty alcohols.

71. The detergent composition as defined by claim 68, wherein the surfactant is selected from the group consisting of sodium alkylbenzene-sulfonates, sodium stearate, sulfates of fatty alcohols, sulfates of polyethoxylated fatty alcohols, and polyethoxylated fatty alcohols.

72. The detergent composition as defined by claim 41, wherein the detergent builder is selected from the group consisting of sodium carbonate, sodium disilicate, sodium orthophosphate, sodium pyrophosphate and sodium tripolyphosphate.

73. The detergent composition as defined by claim 42, wherein the detergent builder is selected from the group consisting of sodium carbonate, sodium disilicate, sodium orthophosphate, sodium pyrophosphate and sodium tripolyphosphate.

74. The detergent composition as defined by claim 46, wherein the detergent builder is selected from the group consisting of sodium carbonate, sodium disilicate, sodium orthophosphate, sodium pyrophosphate and sodium tripolyphosphate.

75. The detergent composition as defined by claim 47, wherein the adjuvant is sodium perborate.

76. A fibrous textile substrate comprising a plurality of individual fibers, each of said fibers having sorbed thereon a soil-releasing amount of the linear, hydrophilic polyurethane as defined by claim 1.

77. A fibrous textile substrate comprising a plurality of individual fibers, each of said fibers having sorbed thereon a soil-releasing amount of the linear, hydrophilic polyurethane as defined by claim 5.

78. A fibrous textile substrate comprising a plurality of individual fibers, each of said fibers having sorbed thereon a soil-releasing amount of a linear, hydrophilic polyurethane having a relative viscosity of at least about 2, said polyurethane comprising the reaction product of:
 (a) from 10 to 70 weight percent of a polyester having a hydroxyl number of less than 120 mg KOH/g and an acid number of not more than 3 mg KOH/g, said polyester being the condensation product of a dicarboxylic acid or ester-forming derivative thereof with a diol;
 (b) from 30 to 90 weight percent of an isocyanato prepolymer having NCO terminal groups, said prepolymer being the reaction product of a non-ionic hydrophilic macrodiol with a diisocyanate; and
 (c) wherein the overall ratio of NCO/OH groups ranges from between about 0.8 and 1.

79. A method of treating fiber-containing materials to impart soil-resistance, anti-soil redeposition and anti-static characteristics thereto, which comprises washing said materials with water in the presence of an amount sufficient to impart said characteristics of the linear, hydrophilic polyurethane as defined by claim 1.

80. The method of treating fiber-containing materials to impart soil-resistance, anti-soil redeposition and anti-static characteristics thereto, which comprises washing said materials with water, in the presence of an amount sufficient to impart said characteristics of the linear, hydrophilic polyurethane as defined by claim 5.

81. A method of treating fiber-containing materials to impart soil-resistance, anti-soil redeposition and anti-static characteristics thereto, which comprises washing said materials with water, in the presence of an amount sufficient to impart said characteristics of a linear, hydrophilic polyurethane having a relative viscosity of at least about 2, said polyurethane comprising the reaction product of:
 (a) from 10 to 70 weight percent of a polyester having a hydroxyl number of less than 120 mg KOH/g and an acid number of not more than 3 mg KOH/g, said polyester being the condensation product of a dicarboxylic acid or ester-forming derivative thereof with a diol;
 (b) from 30 to 90 weight percent of an isocyanato prepolymer having NCO terminal groups, said prepolymer being the reaction product of a non-ionic hydrophilic macrodiol with a diisocyanate; and
 (c) wherein the overall ratio of NCO/OH groups ranges from between about 0.8 and 1.

82. A method of treating fiber-containing materials to impart soil-resistance, anti-soil redeposition and anti-static characteristics thereto, which comprises washing said materials with water, in the presence of an amount sufficient to impart said characteristics of the detergent composition as defined by claim 24.

83. A method of treating fiber-containing materials to impart soil-resistance, anti-soil redeposition and anti-static characteristics thereto, which comprises washing said materials with water, in the presence of an amount sufficient to impart said characteristics of the detergent composition as defined by claim 27.

84. A method of treating fiber-containing materials to impart soil-resistance, anti-soil redeposition and anti-static characteristics thereto, which comprises washing said materials with water, in the presence of an amount sufficient to impart said characteristics of the detergent composition as defined by claim 31.

85. A composition of matter which comprises a powder, said powder comprising from 10 to 90 weight percent of a mineral filler, and 90 to 10 weight percent of the linear, hydrophilic polyurethane as defined by claim 1.

86. A composition of matter which comprises a powder, said powder comprising from 10 to 90 weight percent of a mineral filler, and 90 to 10 weight percent of the linear, hydrophilic polyurethane as defined by claim 5.

87. A composition of matter which comprises a powder, said powder comprising from 10 to 90 weight percent of a mineral filler, and 90 to 10 weight percent of a linear, hydrophilic polyurethane having a relative viscosity of at least about 2, said polyurethane comprising the reaction product of:
  (a) from 10 to 70 weight percent of a polyester having a hydroxyl number of less than 120 mg KOH/g and an acid number of not more than 3 mg KOH/g, said polyester being the condensation product of a dicarboxylic acid or ester-forming derivative thereof with a diol;
  (b) from 30 to 90 weight percent of an isocyanato prepolymer having NCO terminal groups, said prepolymer being the reaction product of a non-ionic hydrophilic macrodiol with a diisocyanate; and
  (c) wherein the overall ratio of NCO/OH groups ranges from between about 0.8 and 1.

88. The composition of matter as defined by claim 85, comprising from 40 to 70 weight percent of the mineral filler and 60 to 30 weight percent of the linear, hydrophilic polyurethane.

89. The composition of matter as defined by claim 86, comprising from 40 to 70 weight percent of the mineral filler and 60 to 30 weight percent of the linear, hydrophilic polyurethane.

90. The composition of matter as defined by claim 87, comprising from 40 to 70 weight percent of the mineral filler and 60 to 30 weight percent of the linear, hydrophilic polyurethane.

* * * * *